United States Patent [19]

Henderson

[11] 4,113,518

[45] Sep. 12, 1978

[54] METHOD OF MANUFACTURING A CORROSION RESISTANT ROTOR ASSEMBLY

[75] Inventor: David L. Henderson, O'Fallon, Mo.

[73] Assignee: Emerson Electric Co., St. Louis, Mo.

[21] Appl. No.: 663,146

[22] Filed: Mar. 2, 1976

[51] Int. Cl.$^2$ .............................................. C23F 7/10
[52] U.S. Cl. ......................... 148/6.15 Z; 148/6.15 R; 29/598; 310/45
[58] Field of Search .................. 427/104; 148/6.15 Z, 148/6.15 R; 29/598; 335/297; 310/45, 42, 273; 336/234, 219

[56] References Cited

U.S. PATENT DOCUMENTS

| | | | |
|---|---|---|---|
| 2,590,927 | 4/1952 | Brandt et al. | 148/6.15 R |
| 3,114,661 | 12/1963 | Palm | 148/6.15 Z X |
| 3,297,493 | 1/1967 | Blum et al. | 148/6.15 Z |
| 3,373,485 | 3/1968 | Nelsen | 29/598 |
| 3,990,141 | 11/1976 | Stark | 310/42 |

FOREIGN PATENT DOCUMENTS

392,260  5/1933  United Kingdom ............... 148/6.15 R

*Primary Examiner*—Ralph S. Kendall
*Attorney, Agent, or Firm*—Polster, Polster and Lucchesi

[57] ABSTRACT

A method of making a rotor includes mounting a laminated rotor core on a plain steel shaft, treating the assembled rotor in its entirety with surface oil retention solution, including wicking the solution between laminations of the laminated rotor core, and thereafter coating the exposed surfaces of the treated assembled rotor with oil. The resulting rotor is unitarily treated and coated with oil.

12 Claims, 1 Drawing Figure

METHOD OF MANUFACTURING A CORROSION RESISTANT ROTOR ASSEMBLY

BACKGROUND OF THE INVENTION

Conventionally, rotors of dynamoelectric machines are treated to protect the rotor from rust, because rust, forming on the rotor, will bridge the air gap between the rotor and the facing stator teeth. Most commonly, zinc chromate is applied as a coating to the outside surface of the rotor. However, it has been found that rust, starting from between the rotor laminations, forces its way through the zinc chromate coating. It has also been common heretofore to coat the shaft with zinc phosphate, before the rotor was shrunk onto the shaft. The shaft so treated is then subjected to the rotor shrink temperature and tends to be scratched during the assembly of the rotor on the shaft.

One of the objects of this invention is to provide a rotor assembly which has superior rust resistance as compared with rotor assemblies known heretofore, and a method of manufacturing the rotor.

Other objects will become apparent to those skilled in the art in the light of the following description and accompanying drawing.

SUMMARY OF THE INVENTION

In accordance with this invention, generally stated, a laminated rotor core is assembled on a plain steel shaft; the assembled rotor is treated in its entirety with surface oil retention solution, the treatment including wicking the solution between laminations of the laminated rotor core, and thereafter the exposed surfaces of the rotor assembly are coated with oil. A rotor is produced in which the rotor core and shaft have been treated in one operation with a unitary coating of surface oil retention solution, and thereafter coated with oil. The term "plain" as applied to the shaft is used to mean not previously treated for rust prevention. The term "exposed" as applied to the surfaces of the assembled rotor is used to mean liable to rust in the normal intended use of the rotor assembly.

BRIEF DESCRIPTION OF THE DRAWING

In the FIGURE is a flow diagram illustrating steps in the preferred embodiment of method of this invention.

DESCRIPTION OF THE PREFERRED EMBODIMENT

Figure 1:
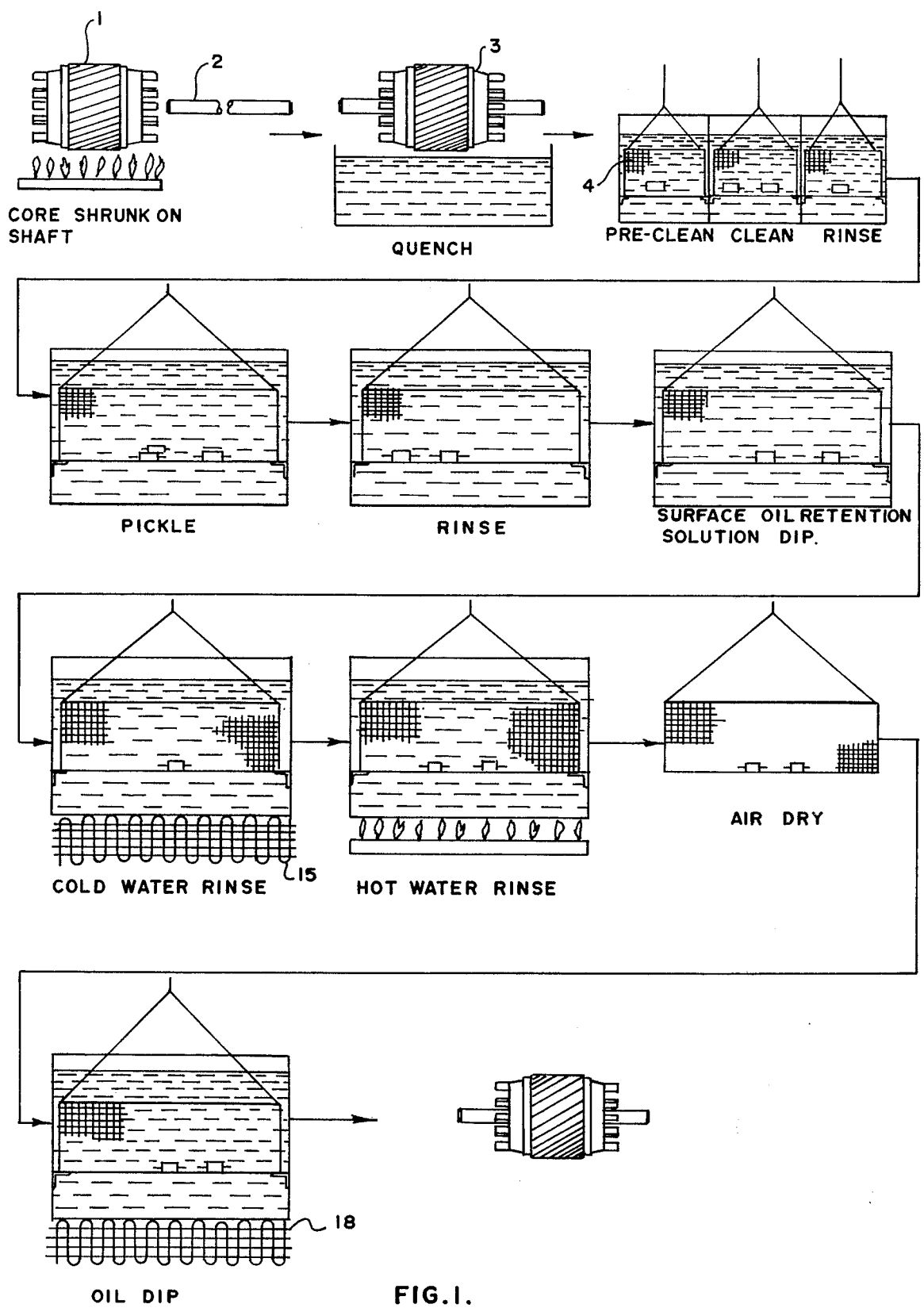

Referring now to the drawing, the steps of the preferred embodiment of process of this invention are shown as beginning in the upper lefthand corner and continuing as indicated by the arrows. The steps include heating to around 900° F. a conventional laminated rotor core 1, in which iron laminations are secured by skewed aluminum bars cast integrally with end rings and, in the embodiment shown, blades, and shrinking the rotor core onto a plain steel shaft 2 which is at about room temperature, to produce a rotor assembly 3. The rotor assembly is then water quenched. Following the water quench, the rotor assembly, in a rack 4, is given a precleaning step, which is chiefly to de-oil the rack; a cleaning step, chiefly to clean the shaft, since the outside diameter of the rotor is freshly machined and therefore clean, and a water rinse to remove any cleaning solution. In the cleaning step, in the preferred embodiment, a non-silicate alkali cleaner, of a type which is standard for cleaning aircraft, is used, to prevent corrosion of the aluminum. A suitable commercially available cleaner is Turco Products Co. No. 4215, non-silicate. The rinsing step is followed by a pickling step. In the pickling step of the preferred embodiment, the pickling solution contains 33% to 40% by volume hydrochloric acid, and in addition, wetting agents. Following the pickling step, the rotor assembly is rinsed in water.

The next step is the treatment of the rotor assembly with surface oil retention solution. In the preferred embodiment, the solution is 3% to 4% by weight zinc phosphate in water, and the solution is maintained at a temperature of 170° F. to 180° F. Under these conditions, the viscosity of the solution is about that of water. The rotor is immersed for approximately six minutes and then removed from the solution. The amount of compressive force on the laminations between the end rings is conventional. During the immersion, the solution wicks between the laminations of the laminated rotor. The elevated temperature of the solution seems to facilitate the wicking.

Following the removal of the assembly from the phosphate solution, the rotor assembly is given a cold water rinse for about three minutes, which appears to set the phosphate coating. The water of the cold water rinse is, in this embodiment, maintained by cooling coils 15 at about 60° F. The cold water rinse is followed by a hot water rinse, in water at between 200° F. and 212° F. The hot water rinse serves two functions. It dissolves excess zinc phosphate, and it heats the rotor assembly. The rotor assembly is kept in the hot water rinse until it reaches a temperature of around 180° F. The rotor assembly is then removed from the hot water rinse and permitted to air dry on its way to the next step, that of oil dipping. It has been found in practice that the rotor will dry to the desired dryness in thirty seconds.

The dry rotor is then immersed in a solvent based water-displacing oil, of the type well known in the plating industry, which has a viscosity of less than 32 seconds Saybolt at 100° F. A suitable commercially available oil is Engineered Lubricants Co. No. 50276X.

The oil is cold, and is maintained at approximately room temperature by cooling coils 18, which ensures that the rotor, which is at a temperature in the neighborhood of 180° F. when it is immersed, is cooled to room temperature within a period of approximately three minutes. In this time, the oil has wicked between the lamination, covering all of the exposed surfaces of the rotor core, as well as the shaft.

The calculated thickness of the phosphate coat is about 300 mg per square foot, but the exact amount of coating is not essential to the present invention. The coating, of whatever actual thickness, obtained by the method described, has been found to produce excellent oil retention, and superior rust prevention. In the embodiment described, the treatment does not interfere with the use of conventional bearings of a size which would have been used had the shaft been treated conventionally.

The unitary coating produced by the method of this invention has numerous advantages. The shaft is coated with a single thickness of phosphate, which, at the same time, is not subjected to the hazards of the high shrink temperature of the rotor or scratching during the assembling of the rotor on the shaft. The rotor core is protected on all of its exposed surfaces, not merely on its outside surface.

As has been indicated, the preferred surface oil retention solution is a solution of zinc phosphate. Iron phosphate and manganese phosphate are operative, but are not as effective as zinc.

Numerous variations in the method of this invention within the scope of the appended claims will occur to those skilled in the art in the light of the foregoing disclosure. Merely by way of example, in the cleaning step by which the shaft is cleaned, the cleaning solution may be used at temperatures from room temperature to 190° F. The pickling step can be omitted, although it is preferred. In the pickling step, other acids, for example phosphoric acid, can be used in lieu of or in combination with hydrochloric acid. In the treatment of the rotor with phosphate, the phosphate solution is preferably kept hot, but temperatures ranging from room temperature to 190° F. can be used. The hot water rinse step can even be omitted, but as has been explained, it is greatly to be preferred, for the reasons assigned in the description. Other means of mounting the rotor core to the shaft can be employed. The shrinking method described is not only the method employed in the commercial practice of this invention, but illustrates certain advantages of the method of this invention. The cleaning solution can be of different kinds, particularly if different types of laminated rotors are being treated. So-called hot-dip types of water displacing oil can be used, although the preferred type has been found superior. Additional drying or alternative drying procedures to the heating of the rotor by the final hot water rinse can be employed, but the preferred method is eminently effective. The surface produced by the phosphate treatment of the preferred method retains the oil evenly and tenaciously. An important aspect of the invention is the treatment of the exposed surfaces of the entire assembly with surface oil retention solution in one operation, and to that aspect, the specific surface oil retention solution is not essential. The lengths of time, other temperatures, and concentrations of solutions can also be varied, but those given in the preferred method described have been found to produce optimum results in the minimum amount of time. These variations are merely illustrative.

Having thus described the invention, what is claimed and desired to be secured by Letters Patent is:

1. A method of making a rust-resistant rotor comprising
   (a) a step of forming an assembled rotor, said step including mounting a laminated rotor core on a steel shaft,
   (b) thereafter a step of treating the assembled rotor in its entirety with surface oil retention solution, comprising an aqueous metal phosphate solution, said step including wicking said solution between laminations of said laminated rotor core, and
   (c) thereafter a step of coating the exposed surfaces of said assembled rotor with oil, said step including wicking said oil between laminations of said laminated rotor core.

2. A method of making a rust resistant rotor comprising
   (a) a step of forming an assembled rotor, said step including mounting a laminated rotor core on a steel shaft,
   (b) thereafter a step of cleaning said assembled rotor with non-silicate alkali cleaning solution,
   (c) thereafter a step of treating the assembled rotor in its entirety with surface oil retention solution, said step including wicking said solution between laminations of said laminated rotor core,
   (d) thereafter a step of coating the exposed surfaces of said assembled rotor with oil, said step including wicking said oil between laminations of said laminated rotor core.

3. A method of making a rust-resistant rotor comprising
   (a) a step of forming an assembled rotor, said step including mounting a laminated rotor core on a steel shaft, by heating the rotor core and shrinking it onto a plain steel shaft,
   (b) thereafter a step of treating the assembled rotor in its entirety with surface oil retention solution, said step including wicking said solution between laminations of said laminated rotor core, and
   (c) thereafter a step of coating the exposed surfaces of said assembled rotor with oil, said step including wicking said oil between laminations of said laminated rotor core.

4. A method of making a rust-resistant rotor comprising
   (a) a step of forming an assembled rotor, said step including mounting a laminated rotor core on a steel shaft,
   (b) thereafter a step of treating the assembled rotor in its entirety with surface oil retention solution, said step comprising immersing the assembled rotor in an aqueous metal phosphate solution, said step including wicking said solution between laminations of said laminated rotor core,
   (c) thereafter rinsing said rotor, and
   (d) thereafter a step of coating the exposed surfaces of said assembled rotor with oil, said step including wicking said oil between laminations of said laminated rotor core.

5. The method of claim 4 which includes pickling the assembled rotor before immersing said rotor in phosphate solution.

6. The method of claim 4 wherein the metal phosphate is taken from the group consisting of zinc, iron and manganese phosphates.

7. The method of claim 4 wherein the metal phosphate solution is an aqueous solution of zinc phosphate containing on the order of 3 to 4 percent zinc phosphate by weight.

8. The method of claim 4 which includes the steps of first rinsing in cold water the rotor which has been immersed previously in phosphate solution, said cold water being at a temperature to set said phosphate on the exposed surfaces of said rotor, and thereafter rinsing said rotor in hot water, at a temperature higher than 180° F.

9. The method of claim 8 wherein the rotor is kept in the hot water until the rotor has attained a temperature on the order of 180° F., the rotor is then removed, permitted to air dry for a short time, and immersed in a solvent-based water-displacing oil.

10. The method of claim 9 wherein the said oil is maintained at a temperature on the order of room temperature.

11. The method of claim 4 wherein the step of coating said rotor with oil includes immersing said rotor in solvent-based water-displacing oil.

12. The method of claim 2 wherein the rotor core assembly is made by heating the rotor core and shrinking it onto a plain steel shaft; the assembly is cleaned in a non-silicate alkali cleaning solution, and thereafter rinsed; thereafter pickled in an aqueous solution containing on the order of 30 to 40 percent hydrochloric acid, and rinsed; thereafter immersed in an aqueous solution of a phosphate taken from the group consisting of zinc, iron and manganese of a concentration corresponding to the order of 3 to 4 percent by weight of zinc phosphate, said solution being at a temperature on the order of 170°–180° F.; thereafter immersed in water at a temperature less than 100° F.; thereafter immersed in water at a temperature greater than 180° F. until the rotor assembly attains a temperature on the order of 180° F.; air dried, and immersed in a solvent based water-displacing oil of a viscosity to permit wicking of said oil between laminations of the rotor core.

* * * * *